US006943798B1

(12) United States Patent
Olano et al.

(10) Patent No.: US 6,943,798 B1
(45) Date of Patent: Sep. 13, 2005

(54) METHOD AND SYSTEM FOR EXECUTING SIMD INSTRUCTIONS USING GRAPHICS TECHNOLOGY

(75) Inventors: Thomas M. Olano, San Francisco, CA (US); Mark S. Peercy, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 605 days.

(21) Appl. No.: 09/638,907

(22) Filed: Aug. 15, 2000

(51) Int. Cl.[7] .............................................. G06F 13/00
(52) U.S. Cl. ....................... 345/536; 345/537; 345/538; 345/545; 345/552
(58) Field of Search ......................... 345/556, 564–566, 345/536–538, 526, 511, 552, 545, 431; 712/22

(56) References Cited

U.S. PATENT DOCUMENTS

| 5,230,039 | A | * | 7/1993 | Grossman et al. | |
| 5,481,669 | A | * | 1/1996 | Poulton et al. | |
| 5,513,366 | A | * | 4/1996 | Agarwal et al. | |
| 5,710,876 | A | | 1/1998 | Peercy et al. | 395/126 |
| 5,880,736 | A | | 3/1999 | Peercy et al. | 345/426 |
| 5,923,338 | A | * | 7/1999 | Rich | 345/505 |
| 5,949,424 | A | | 9/1999 | Cabral et al. | 345/426 |
| 6,057,852 | A | * | 5/2000 | Krech, Jr. | 345/589 |

OTHER PUBLICATIONS

"3.1.2 SIMD Computers," http://aquarius.u-aizu.ac.jp/CSEP/CA/NODE13A.HTM, 1 page, Apr. 24, 2000.
"Explanation of fields in GPC Benchmark Results," www.spec.org/gpc/apc.static/explain.htm, 6 pages, Apr. 26, 2000.
"Frame Buffer FAQ," http://bul.eecs.umich.edu/~crowej/sunfaq/FrameBuffer.html, 40 pages, Apr. 26, 2000.
Hwang, K., "Multivector and SIMD Computers," *Advanced Computer Architecture: Parallelism, Scalability, Programmability*, 1993, McGraw–Hill, Inc., 446–457.
Intel Corporation, "Welcome to Streaming SIMD Extensions," www.intel.com/vtune/cbts/simd.htm, 1 page, Apr. 19, 2000.
"MasPar Computer Corporation," www.nhse.npac.syr.edu/hpccsurvey/orgs/maspar/maspar.html, 10 pages, May 12, 2000.
Monitor World.com, "Fixed Frequency FAQ—How does a 3D graphics accelerator work?" www.monitorworld.com/faq_pages/q39_page.html, 3 pages, Apr. 27, 2000.
Parhami, B., "SIMD Machines: Do They Have a Significant Future?" *Report from The Fifth Symposium on the Frontiers of Massively Parallel Computation*, McLean, VA, Feb. 9, 1995, www.ece.ucsb.edu/Faculty/Parhami/FMPC95–SMID–Panel.html, 5 pages.
"SGI—Octane Workstation Graphics," www.sgi.com/octane/graphics.html, 3 pages, Apr. 26, 2000.
"SGI—Octane: New Computer Architectures for the Entertainment Industry," www.sgi.com/octane/ent_wp.html, 7 pages, Apr. 21, 2000.

(Continued)

*Primary Examiner*—Kee M. Tung
*Assistant Examiner*—Hau Nguyen
(74) *Attorney, Agent, or Firm*—Woodcock Washburn LLP

(57) ABSTRACT

A method and system are provided for executing SIMD instructions using graphics technology. A SIMD instruction is received and interpreted. The specific data needed for the SIMD instruction is identified. Texel addresses where the specific data are stored are recalled and frame buffer pixels to be used to support the SIMD instruction are selected. In an alternative embodiment, these texel addresses are stored in frame buffer pixel channels such that the pixel containing a particular address will be the pixel to hold the data stored at that address for the SIMD operation.

23 Claims, 7 Drawing Sheets

OTHER PUBLICATIONS

"SGI—OpenGL Frequently Asked Questions," www.sgi.com/software/opengl/faq.html, 5 pages, Feb. 8, 2002.
"SGI—OpenGL Technical Information," www.sgi.com/software/opengl/datasheet.html, 9 pages, Apr. 26, 2000.
"SGI—OpenGL Overview," www.sgi.com/software/opengl/overview.html, 1 page, Apr. 19, 2000.
"SGI—Company Fact Sheet," www.sgi.com/newsroom/factsheet.html, 3 pages, May 15, 2000.
"SGI—Products: Hardware/Workstations," www.sgi.com/products/hw_workstations.html, 4 pages, Apr. 24, 2000.
"SGI—Family of Servers Overview," www.sgi.com/servers/ 2 pages, Apr. 24, 2000.
The PC Guide, "3D Images and Operations," www.pcguide.com/ref/video/3dImages–c.html, 2 pages, Apr. 26, 2000.
University of Colorado at Denver, "Parallel Architectures," www.carbon.cudenver.edu/~galaghba/parallel.html, 2 pages, Apr. 19, 2000.
University of Colorado at Denver, "Data Flow," www.carbon.cudenver.edu/~galaghba/fdata_flow.htm, 1 page, Apr. 19, 2000.
University of Colorado at Denver, "SMID Architectures," www.carbon.cudenver.edu/~galaghba/simd.html, 2 pages, Apr. 19, 2000.
Kempf, R. et al. (Eds.), "Introduction to OpenGL"*OpenGL Reference Manual, Second Edition*, Chapter 1, Addison–Wesley Publishing Co., Reading, MA, 1997.

* cited by examiner

Figure 2

Texture Memory

Figure 3

Texture Memory

| | t => | | | | | | | |
|---|---|---|---|---|---|---|---|---|
| s | R | G | R | G | R | G | R | G |
| ↓ | 43 | α | 57 | α | 19 | α | 31 | α |
| v | R | G | R | G | R | G | R | G |
| | 11 | α | 53 | α | 23 | 17 | 61 | α |
| | R | G | R | G | R | G | R | G |
| | 37 | α | 41 | α | B | α | B | α |
| | R | G | R | G | R | G | R | G |
| | 59 | 51 | B | α | B | α | B | 55 |

Figure 4

Frame Buffer

| | y => | | | | | | |
|---|---|---|---|---|---|---|---|
| x | R | G | R | G | R | G | R | G |
| \| | 1 | 1 | B | α | B | α | B | α |
| V | R | G | R | G | R | G | R | G |
| | B | α | 0 | 1 | B | α | 3 | 3 |
| | R | G | R | G | R | G | R | G |
| | B | α | 3 | 0 | B | α | B | α |
| | R | G | R | G | R | G | R | G |
| | B | α | B | α | 3 | 3 | B | α |

Figure 5

Frame Buffer

| | y => | | | | | | | |
|---|---|---|---|---|---|---|---|---|
| x | R | 53 | R | G | R | G | R | G |
| ↓ | 1 | 1 | B | α | B | α | B | α |
| v | R | G | R | 57 | R | G | 55 | G |
| | B | α | 0 | 1 | B | α | 3 | 3 |
| | R | G | 51 | 59 | R | G | R | G |
| | B | α | 3 | 0 | B | α | B | α |
| | R | G | R | G | 55 | G | R | G |
| | B | α | B | α | 3 | 3 | B | α |

Figure 6

Frame Buffer y => x
|
V

| R | 56 | R | G | R | G | R | G |
|---|----|---|---|---|---|---|---|
| 1 | 1  | B | α | B | α | B | α |
| R | G' | R | 60| R | G | 58| G |
| B | α  | 0 | 1 | B | α | 3 | 3 |
| R | G  | 54| 62| R | G | R | G |
| B | α  | 3 | 0 | B | α | B | α |
| R | G  | R | G | 58| G | R | G |
| B | α  | B | α | 3 | 3 | B | α |

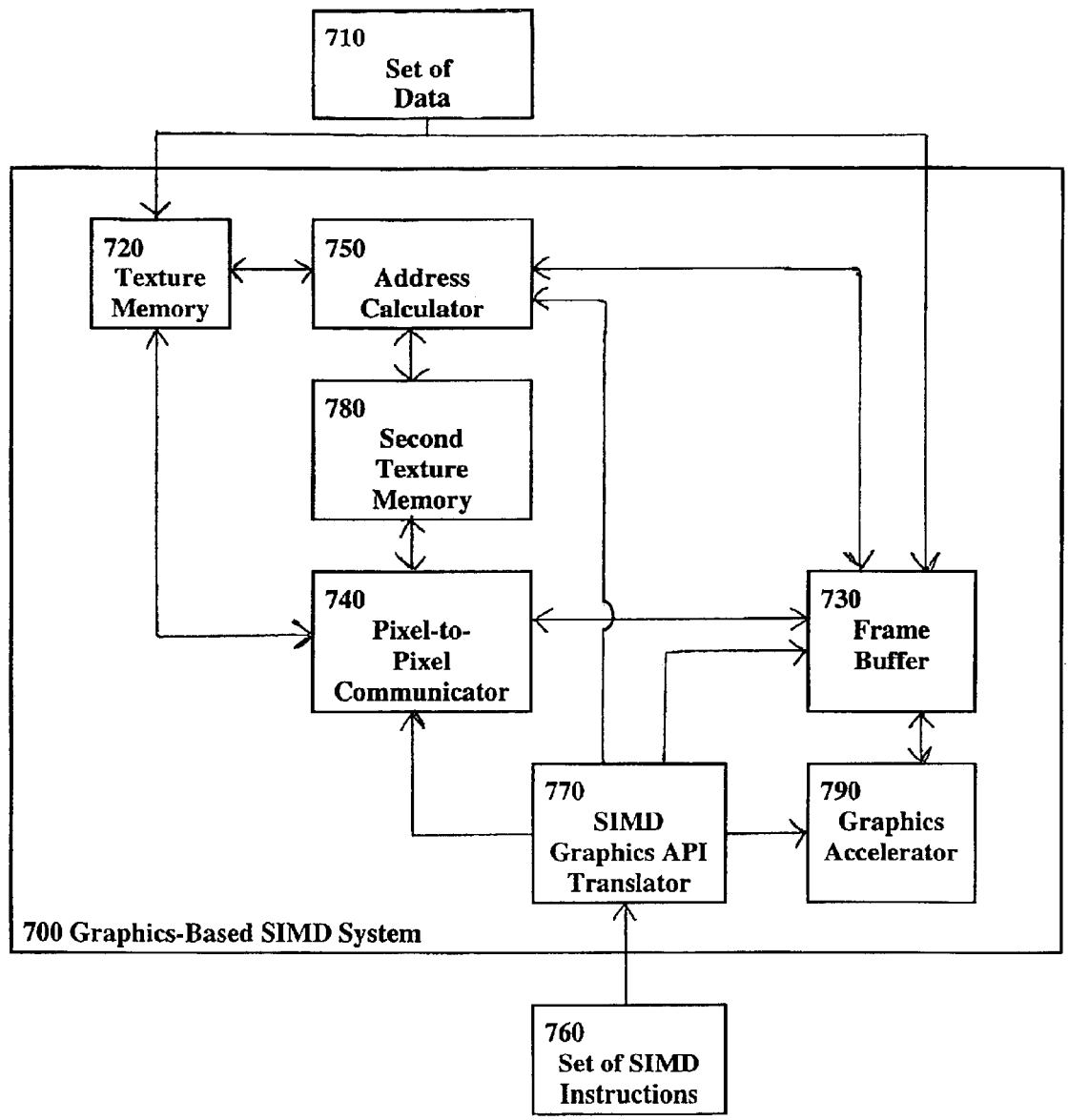

METHOD AND SYSTEM FOR EXECUTING SIMD INSTRUCTIONS USING GRAPHICS TECHNOLOGY

BACKGROUND OF THE INVENTION

1. Field of the Invention

The present invention relates generally to single instruction, multiple data (SIMD) computer architecture.

2. Discussion of the Related Art

SIMD computer architecture was first developed in the 1970s as a means for increasing the rate at which a computer can complete calculations. The design uses an array of processing elements to perform a common instruction on multiple pieces of data simultaneously. This arrangement minimizes the number of logic gates that must be dedicated to control—fetching, decoding, and scheduling instructions—with a consequential increase in the number of logic gates available for storage and data processing.

Successful exploitation of this design depends on the ability to develop parallel algorithms that maximize the number of operations that can be performed simultaneously via the given number of processing elements.

Certain situations naturally lend themselves to parallel processing. As a result, SIMD computing has been found to be particularly useful in applications for air traffic control, aircraft early warning radar surveillance, weather data management, command and control processing, signal/image processing, cancer radiation research, decision support, and bioinformatics.

These specialty applications have resulted in SIMD machines being designed for dedicated purposes. Because the design and testing costs of custom SIMD chips are borne by a small user base, SIMD hardware computers tend to be more expensive than general purpose workstations.

The ability of computers to do more work is enhanced by their ability to do different kinds of work. Along this line of reasoning, the development of computer graphic capabilities has followed the observation that such features appeal to a wide variety of users. Computer graphics systems are commonly used for displaying graphical representations of objects on a two-dimensional video display screen. Current computer graphics systems provide highly detailed representations and are used in a variety of applications.

However, the generation of a graphics image by a computer system requires a great deal of the processing power of that system. Therefore, it has become common for computer systems to include graphics accelerators to assist the central processing unit in its operations by taking over some portion of the data processing function relating to graphics. Current graphics accelerators typically employ an array of processors with various alterations and additions to the circuitry to facilitate the complex calculations associated with the graphical rendering of images.

The widespread desire for computer graphics features has resulted in the successful marketing of computers that can support these capabilities. The large customer base for these workstations has allowed them to be priced generally lower than special purpose SIMD machines.

SUMMARY OF THE INVENTION

The present invention provides a method and system for executing SIMD instructions using graphics technology. The present invention exploits the availability of multiple processors that are available within a graphics accelerator. Although these processors are designed to support the display of graphical representations of objects, the present invention uses the processors to perform SIMD operations. Other features common to graphics-capable computers, specifically frame buffers and texture memories, are used in conjunction with a graphics application programming interface language to realize the effect of communications among processing elements that occurs in various hardware manifestations of SIMD architectures.

Because graphics computers are typically less expensive than hardware manifestations of SIMD architectures, the present invention enables graphics computer users to realize the benefits of SIMD operations without incurring the added cost of purchasing a computer with SIMD hardware.

In one embodiment, a method for executing single instruction, multiple data (SIMD) instructions using graphics technology is explained. A graphics application programming interface, preferably OpenGL with a pixel texture extension, is used to transfer data between a frame buffer and texture memory. Data in the frame buffer support operations by a graphics accelerator. The arrangement supports cycles of SIMD operations.

Multiple data are initially read into one or more of a plurality of texel channels in the texture memory. However, one skilled in the art will recognize that, alternatively, data may be read into one or more of a plurality of pixel channels in the frame buffer and then copied into the texture memory. Once data are stored in texels, addresses of one or more dimensions are determined for the texels.

A set of SIMD instructions is received and translated. A set of specific data needed for the set of SIMD instructions is distinguished. Texel addresses where the set of specific data is stored are recalled and frame buffer pixels to be used to support the set of SIMD instructions are selected. In a preferred embodiment, these texel addresses are stored in frame buffer pixel channels such that the pixel containing a particular address will be the pixel to hold the data stored at that texel address for the SIMD operations. In an alternative embodiment with a second texture memory, the texel addresses can be stored in selected texels of the second texture memory. Thereafter, the stored texel addresses can be retrieved into the selected frame buffer pixels.

The recalled texel addresses are used to retrieve the set of specific data into one or more channels of the selected frame buffer pixels. Once in the frame buffer, the set of SIMD instructions is performed on the data via the graphics accelerator. Thereafter, results of the SIMD operations are written over the original data in the selected frame buffer pixels. From the frame buffer pixels, the data may, depending on the requirements of the set of SIMD instructions received and the particular embodiment of the invention, be copied into texture memory to support another cycle of SIMD instructions.

Further features and advantages of the present invention, as well as the structure and operation of various embodiments, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

FIG. 2 shows a section of texture memory.

FIG. 3 shows the same section of texture memory with a set of multiple data read into the blue and alpha channels of a set of texels.

FIG. 4 shows a section of the frame buffer in which selected pixels contain the addresses of texels that are storing data needed for a set of SIMD instructions. Texel row addresses are stored in the blue channel and texel column addresses are stored in the alpha channel.

FIG. 5 shows the same section of the frame buffer in which data, located at the stored texel addresses, have been copied into the red and green channels of the corresponding selected pixels.

FIG. 6 shows the same section of the frame buffer in which the results of the set of SIMD instructions have been stored into the red and green channels of the corresponding selected pixels.

FIG. 7 is a block diagram of a graphics-based SIMD system.

The present invention is described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

Overview and Terminology

Figure 1:
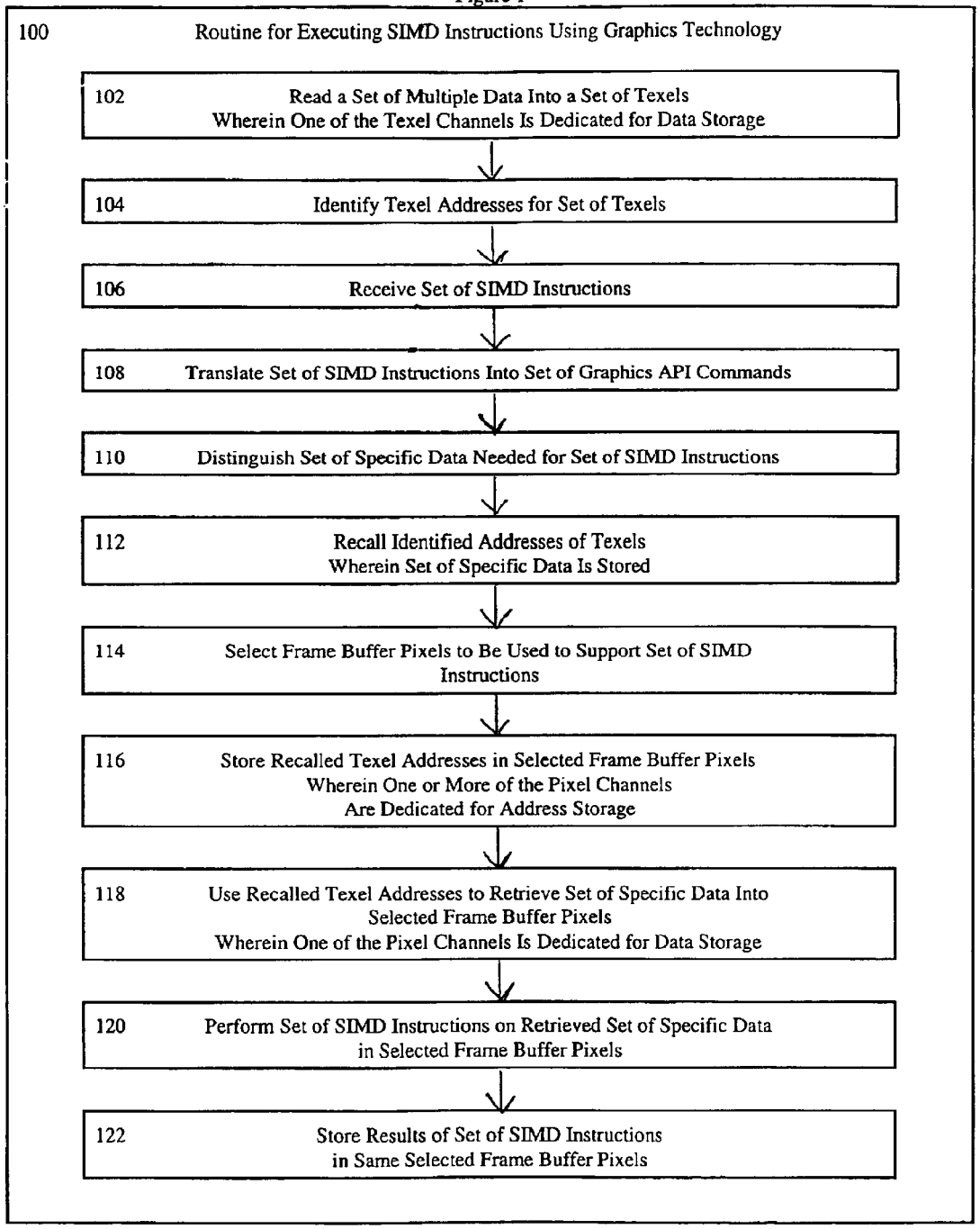
FIG. 1 is a flowchart representation of a routine for executing SIMD instructions using graphics technology.

The present invention provides a method and system for executing SIMD instructions using graphics technology.

"SIMD" is an acronym for Single Instruction Multiple Data, a classification of computer architecture that supports simultaneously performing the same operation on multiple pieces of data.

A "graphics accelerator" refers to any computer hardware component that includes one or more processor(s) designed to perform operations to support the display of graphical representations of objects.

"Graphics application programming interface", or "graphics API", refers to control logic (software, firmware, and/or hardware) that enables developers to exploit the capabilities of graphic accelerators.

A "frame buffer" is memory designed to store the pixels from which a display (e.g., a frame of digital data) is refreshed.

"Texture memory" refers to memory space typically reserved for texture.

A "texel" is a texture memory storage element.

Both pixels and texels have one or more storage channels. Collectively, pixels and texels are types of "graphics memory storage elements".

In one embodiment, commands, written in a graphics application programming language, are used to identify data stored in texels and to copy them into pixels in the frame buffer to support a set of SIMD instructions.

FIG. 1 shows a preferred routine 100 for executing SIMD instructions using graphics technology. The routine of FIG. 1 can be implemented as control logic as part of any graphics system, such as a graphics accelerator. This control logic can be software, firmware, hardware, or any combination thereof. One example implementation for carrying out the approach of FIG. 1 is described with respect to FIG. 7.

Figure 2:
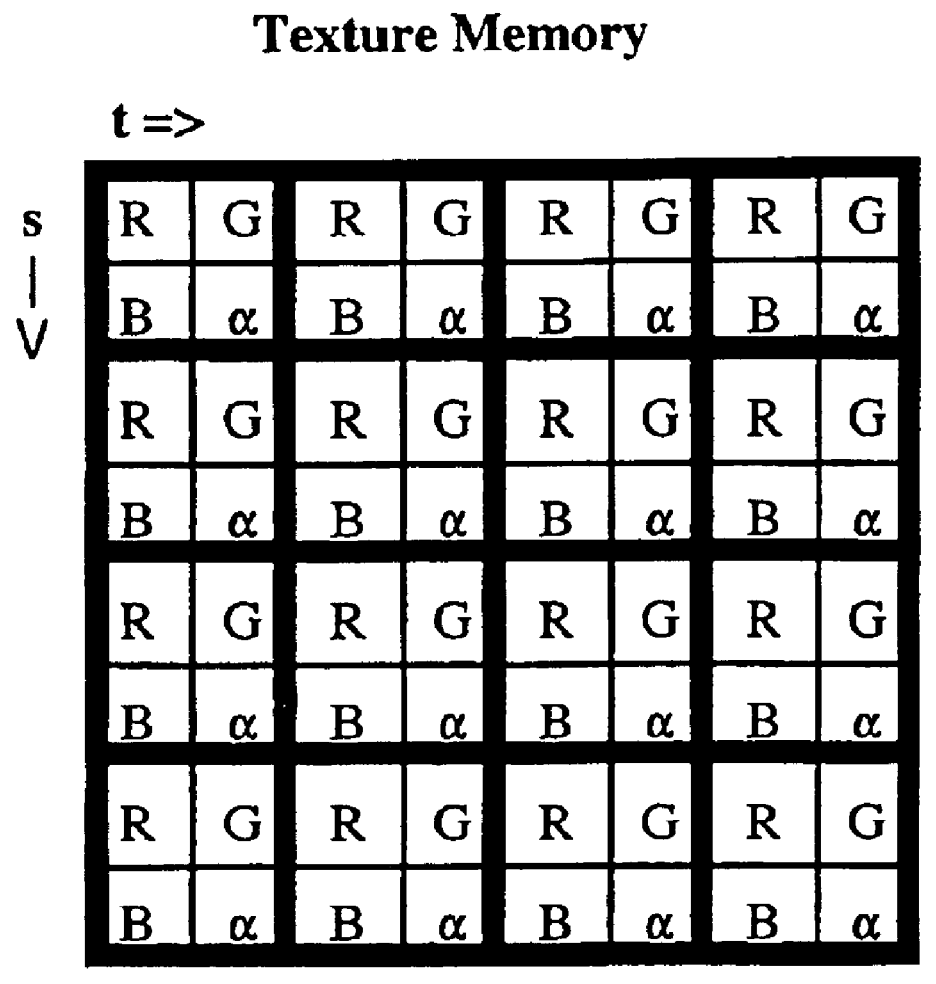

FIG. 2 represents a section of texture memory. Current state of the art texture memory consists of an array of rows and columns of texels, but three-dimensional arrays are conceivably possible. Each texel contains one or more channels. In a preferred embodiment, each texel includes a red, green, blue, and alpha channel, but additional channels can be used. By industry convention, the letter "s" is used to designate rows in the texture memory while the letter "t" indicates columns. Also by convention, the coordinates originate in the upper lefthand corner with the texel at this position identified as 0, 0. The designation of rows increases as one moves downward while column identifiers increase as one moves to the right.

In FIG. 1, at step 102, a set of multiple data is read into a set of texels. One or more of the channels within each texel are dedicated for data storage. Because the present invention supports cycles of SIMD instructions in which multiple data are transferred between texture memory and a frame buffer, it is conceptually convenient to begin describing the present invention with data stored in the texture memory. However, an alternative embodiment may initially copy the set of multiple data from pixels in the frame buffer to the set of texels in the texture memory. This could be the case in a situation where the results of a performed set of SIMD instructions are stored in the frame buffer, but need to be transferred to the texture memory so that further sets of SIMD instructions can be conducted. In another alternative embodiment, data may initially be read into a set of pixels in the frame buffer and then copied to a set of texels in the texture memory. FIG. 3 shows the same section of texture memory as does FIG. 2, but with a set of multiple data read into the blue and alpha channels of a set of texels. This example is illustrative only and is not intended to limit the present invention. Note that the set of data can be read into any combination of texels (contiguous and/or non-contiguous) and does not need to occupy all texels in the texture memory.

In FIG. 1, at step 104, texel addresses for the set of texels are identified. Texel addresses are used to retrieve data for subsequent operations. Depending upon how the set of texels are arranged within the texture memory, the addresses may comprise values in one or more dimensions. In a preferred embodiment in which the texture memory is a two-dimensional array of rows and columns, the addresses are referenced to the "s, t" coordinate system explained above. A preferred embodiment also recognizes that the texture memory is supporting SIMD operations and that multiple data read into the texture memory will likely be retrieved in response to SIMD instructions. Therefore, texel addresses are identified at this early stage in the process. However, one skilled in the art will recognize that, in an alternative embodiment, identification of texel addresses may be delayed until specific data needed for a particular set of SIMD instructions is distinguished.

In FIG. 1, at step 106, a set of SIMD instructions is received. The instructions can include any of a variety of fetch, storage, mathematical, or logic operations, but are not limited to these types. Typically, the set of SIMD instructions will distinguish a specific set of data, fetch the identified set, perform a common mathematical or logical operation on each item in the set, and store the results. Because the present invention involves executing SIMD instructions with graphics technology, the set of SIMD instructions will need to be translated into a set of graphics API commands. This is accomplished at step 108. In a preferred embodiment, the graphics API is OpenGL with a pixel texture extension.

In FIG. 1, at step 110, a specific set of data needed for a set of SIMD instructions is distinguished. Once the specific set of data is distinguished, the texel addresses for the texels where the specific set of data is stored will need either to be identified or to be recalled, if, as in a preferred embodiment, they were identified at a previous step. In FIG. 1, this is accomplished at step 112. For purposes of illustrating the present invention, assume the specific set of data needed for the set of SIMD instructions includes all data with values between 50 and 59. In FIG. 3, this would include data stored in texels with the following addresses (s, t): (0, 1); (1, 1); (3, 0); and (3, 3).

In FIG. 1, at step 114, frame buffer pixels to be used to support the set of SIMD instructions are selected. Also, depending on the data needs specified in the set of SIMD instructions, it is possible that certain data within the specific set of data will need to be retrieved into more than one of the selected frame buffer pixels. Therefore, it is important to note that the present invention does not require any relationship between the pixels selected and the addresses of the texels.

By convention, pixel row and column addresses are identified by a coordinate system similar to that used for texels, except that the horizontal axis is identified with the letter "x" and the vertical axis with the letter "y". For purposes of illustrating the present invention, assume that pixels with the following addresses (x, y) have been selected to support the set of SIMD instructions: (0, 0); (1, 1); (2, 1); (3, 2); and (1, 3).

In a preferred embodiment of the present invention, the set of SIMD instructions includes a command to store the recalled texel addresses in the selected frame buffer pixels. This is shown at step 116 in FIG. 1. Each dimension of a recalled texel address is stored in a different channel of the pixel selected to receive the data stored in the texel. Different channels in the pixels are dedicated for address storage and data storage. Note that the channels dedicated in the selected pixels for address storage and data storage do not need to match the channels used for these purposes in the texels. FIG. 4 shows texel row addresses stored in the blue channel and texel column addresses stored in the alpha channel. At pixel address (0, 0), texel address (1, 1) has been stored; at pixel address (1, 1), texel address (0, 1) has been stored; at pixel address (2, 1), texel address (3, 0) has been stored; at pixel address (3, 2), texel address (3, 3) has been stored; and at pixel address (1, 3), texel address (3, 3) has been stored. Note that texel address (3, 3) has been stored in two pixel locations. This is to illustrate a situation where, as mentioned above, the set of SIMD instructions needs certain data to be retrieved into more than one of the selected frame buffer pixels. A preferred embodiment includes this step as a means of facilitating data retrieval. This step also defines which pixel will receive which particular piece of data However, one skilled in the art will recognize that, in an alternative embodiment, texel addresses may not need to be stored in the selected frame buffer pixels. Particularly, in an alternative embodiment with a second texture memory, texel addresses can be stored in selected texels of the second texture memory. Thereafter, the stored texel addresses can be retrieved into the selected frame buffer pixels.

In FIG. 1, at step 118, the stored texel addresses are used to retrieve the set of specific data into the selected frame buffer pixels. The retrieved data are stored in a pixel channel dedicated for data storage. Again, one skilled in the art will recognize that there are other means by which data may be identified in the texture memory and retrieved into the frame buffer. Particularly, in an alternative embodiment with a second texture memory, texel addresses stored in selected texels of the second texture memory can be retrieved into the selected frame buffer pixels. Thereafter, the stored texel addresses are used to retrieve the set of specific data into the selected frame buffer pixels.

FIG. 5 shows data retrieved into the selected pixels. Data stored in the blue channel of the texels has been retrieved into the green channel of the pixels; data stored in the alpha channel of the texels has been retrieved into the red channel of the pixels. At the green channel of pixel address (0, 0), the value 53 has been retrieved from the blue channel of texel address (1, 1); at the green channel of pixel address (1, 1), the value 57 has been retrieved from the blue channel of texel address (0, 1); at the green channel of pixel address (2, 1), the value 59 has been retrieved from the blue channel of texel address (3, 0); at the red channel of pixel address (2, 1), the value 51 has been retrieved from the alpha channel of texel address (3, 0); at the red channel of pixel address (3, 2), the value 55 has been retrieved from the alpha channel of texel address (3, 3); and at the red channel of pixel address (1, 3), the value 55 has been retrieved from the alpha channel of texel address (3, 3). Two items are worth noting at this step. First, the value 55 from the alpha channel of texel address (3, 3) has been retrieved into two pixels: the red channels of pixel addresses (3, 2) and (1, 3). One skilled in the art will recognize that the value 55 can further be retrieved by other pixels. Second, pixel address (2, 1) has retrieved two values from texel address (3, 0): the value 59 has been retrieved from the blue channel of the texel to the green channel of the pixel and the value 51 has been retrieved from the alpha channel of the texel to the red channel of the pixel. One skilled in the art will recognize that, with the availability of additional channels, further data can be retrieved between texels and pixels. Such an additional channel could be made available in an application in which texel addresses has only one dimension.

In FIG. 1, at step 120, the set of SIMD instructions is performed on the retrieved set of specific data in the selected frame buffer pixels. As previously explained, this may include a variety of operations but the same operation is performed on all pieces of data in the selected frame buffer pixels. For purposes of illustrating the present invention, assume that the set of SIMD instructions comprises the single operation of adding the value 3 to each value stored in the selected pixels.

In a preferred embodiment, the results of the set of SIMD instructions are stored in the same selected frame buffer pixels. This is shown at step 122 in FIG. 1. In this manner, both the results of the set of SIMD instructions are stored, in the selected pixels, and the original set of specific data is stored, in the texels. This arrangement optimizes flexibility in choosing among the options of transferring the results to the texture memory for storage, continuing to perform subsequent sets of SIMD instructions on the results as contained in the frame buffer, or retrieving another set of specific data into the frame buffer. However, one skilled in the art will recognize that it may not always be the case that the results of the set of SIMD instructions should be written over the data stored in the selected frame buffer pixels. FIG. 6 shows the same section of frame buffer as FIG. 5, but with the results of adding 3 to each value previously stored in the selected pixels. At the green channel of pixel address (0, 0), the value 56 has been written over the value 53; at the green channel of pixel address (1, 1), the value 60 has been written over the value 57; at the green channel of pixel address (2, 1), the value 62 has been written over the value 59; at the red channel of pixel address (2, 1), the value 54 has been written over the value 51; at the red channel of pixel address (3, 2 ), the value 58 has been written over the value 55; and at the red channel of pixel address (1, 3), the value 58 has been written over the value 55.

FIG. 7 shows a graphics-based SIMD system 700 for executing SIMD instructions using graphics technology according to one embodiment of the present invention. In a preferred embodiment, a set of data 710 is read into a set of texels in a texture memory 720. Alternatively, the set of data 710 may be read into a set of pixels in a frame buffer 730 and then copied into the texture memory 720 via a pixel-to-pixel communicator 740. Texel addresses for texels storing the set of data are identified by an address calculator 750. A set of SIMD instructions 760 is translated into a corresponding set of graphics API instructions by a SIMD graphics API translator 770. From the set of SIMD instructions 760 a set of specific data is distinguished. The addresses for this set of specific data are recalled from the address calculator 750. Pixels to support the translated set of SIMD instructions are selected in the frame buffer 730. In a preferred embodiment, texel addresses for the set of specific data are stored in the selected pixels in the frame buffer 730, via the address calculator 750, to define which pixel will receive which particular piece of data and to facilitate data retrieval. Alternatively, in an embodiment with a second texture memory 780, texel addresses for the set of specific data are stored in selected texels in the second texture memory 780, via the address calculator 750. Thereafter, the stored texel addresses are retrieved into the selected frame buffer pixels via the pixel-to-pixel communicator 740. The set of specific data is retrieved from the texture memory 720 to the frame buffer 730 via the pixel to pixel communicator 740. Specific translated SIMD operations are passed from the SIMD graphics API translator to a graphics accelerator 790 which performs the operations on the set of specific data stored in the frame buffer 730. In a preferred embodiment, the results of the SIMD operations are stored in the same pixels in the frame buffer 730.

In general, the present invention can be implemented in software, firmware, hardware, or a combination thereof. In one implementation, address calculator 750, SIMD graphics API translator 770, and pixel-to-pixel communicator 740 represent control logic for controlling operations of any one or more processors. This control logic is implemented as software, firmware, hardware, or a combination thereof.

Conclusion

While an embodiment of the present invention has been described above, it should be understood that it has been presented by way of example only, and not limitation. It will be understood by those skilled in the art that various changes in form and detail may be made therein without departing from the spirit and scope of the invention as defined in the appended claims. Thus, the breadth and scope of the present invention should not be limited by the above-described exemplary embodiment, but should be defined only in accordance with the following claims and their equivalents.

What is claimed is:

1. A method for communicating between graphics memory storage elements for performing at least one single instruction, multiple data (SIMD) instruction, comprising the steps of:
    (a) reading a set of data into a set of graphics memory storage elements wherein one or more of a plurality of channels have been dedicated for data storage;
    (b) identifying, for each graphics memory storage element in said set of graphics memory storage elements, an address wherein said identified address can comprise one or more dimensions;
    (c) determining a set of specific data needed for said at least one SIMD instruction;
    (d) recalling each said identified address for each graphics memory storage element where said specific data is stored; and
    (e) using said recalled addresses to retrieve said specific data into another set of graphics memory storage elements wherein one or more of a plurality of channels have been dedicated for data storage.

2. A method for executing single instruction, multiple data (SIMD) instructions using graphics technology, comprising the steps of:
    (a) reading a set of data into a set of texels wherein one or more of a plurality of channels have been dedicated for data storage;
    (b) identifying, for each said texel in said set of texels, an address wherein said address may comprise one or more dimensions;
    (c) receiving a set of SIMD instructions;
    (d) translating said set of SIMD instructions into a set of graphics API commands;
    (e) distinguishing a set of specific data, from said set of data, needed for said set of SIMD instructions;
    (f) recalling each said identified address for each said texel wherein said specific data is stored;
    (g) selecting frame buffer pixels to be used to support said set of SIMD instructions;
    (h) using said recalled addresses to retrieve said specific data into said selected frame buffer pixels wherein one or more of a plurality of channels have been dedicated for data storage; and
    (i) performing said set of SIMD instructions on said retrieved set of specific data in said selected frame buffer pixels.

3. The method according to claim 2, further comprising, in place of step (a), the step of:
    (a) copying a set of data, stored in a set of frame buffer pixels, into a set of texels wherein one or more of a plurality of channels have been dedicated for data storage.

4. The method according to claim 3, further comprising, prior to step (a), the step of reading a set of data into a set of frame buffer pixels wherein one or more of a plurality of channels have been dedicated for data storage.

5. The method according to claim 2, further comprising the step of storing said recalled addresses in said selected frame buffer pixels wherein each dimension of said recalled addresses is stored in a different dedicated channel and wherein each said stored address defines a particular texel from which a particular piece of data, from said set of specific data, will be retrieved.

6. The method according to claim 2, further comprising the step of storing said recalled addresses in selected texels in a second texture memory wherein each dimension of said recalled addresses is stored in a different dedicated channel and wherein each said stored address defines a particular texel from which a particular piece of data, from said set of specific data, will be retrieved.

7. The method according to claim 6, further comprising, after the step of storing, the step of retrieving said stored addresses from said selected texels in said second texture memory to said selected frame buffer pixels.

8. The method according to claim 2, further comprising the step of storing results of said performed set of SIMD instructions in same said selected frame buffer pixels.

9. The method according to claim 2, wherein software used to support the method is a graphics application programming interface.

10. The method according to claim 9, wherein said graphics application programming interface is OpenGL with a pixel texture extension.

11. A system for communicating between graphics memory storage elements for performing at least one single instruction, multiple data (SIMD) instruction, comprising:
    (a) means to receive a set of data into a set of graphics memory storage elements wherein one or more of a plurality of channels have been dedicated for data storage;
    (b) means to identify, for each graphics memory storage element in said set of graphics memory storage elements, an address wherein said identified address can comprise one or more dimensions;
    (c) means to determine a set of specific data needed for said at least one SIMD instruction;
    (d) means to recall each said identified address for each graphics memory storage element where said specific data is stored; and
    (e) means to use said recalled addresses to retrieve said specific data into another set of graphics memory storage elements wherein one or more of a plurality of channels have been dedicated for data storage.

12. A system for executing single instruction, multiple data (SIMD) instructions using graphics technology, comprising:
(a) means to receive a set of data into a set of texels wherein one or more of a plurality of channels have been dedicated for data storage;
(b) means to identify, for each said texel in said set of texels, an address wherein said address may comprise one or more dimensions;
(c) means to receive a set of SIMD instructions;
(d) means to translate said set of SIMD instructions into a set of graphics API commands;
(e) means to distinguish a set of specific data, from said set of data, needed for said set of SIMD instructions;
(f) means to recall each said identified address for each said texel wherein said specific data is stored;
(g) means to select frame buffer pixels to be used to support said set of SIMD instructions;
(h) means to use said recalled addresses to retrieve said specific data into said selected frame buffer pixels wherein one or more of a plurality of channels have been dedicated for data storage; and
(i) means to perform said set of SIMD instructions on said retrieved set of specific data in said selected frame buffer pixels.

13. The system according to claim 12, further comprising means to copy a set of data, stored in a set of frame buffer pixels, into a set of texels wherein one or more of a plurality of channels have been dedicated for data storage.

14. The system according to claim 13, further comprising means to read a set of data into a set of frame buffer pixels wherein one or more of a plurality of channels have been dedicated for data storage.

15. The system according to claim 12, further comprising means to store said recalled addresses in said selected frame buffer pixels wherein each dimension of said recalled addresses is stored in a different dedicated channel and wherein each said stored address defines a particular texel from which a particular piece of data, from said set of specific data, will be retrieved.

16. The system according to claim 12, further comprising means to store said recalled addresses in selected texels in a second texture memory wherein each dimension of said recalled addresses is stored in a different dedicated channel and wherein each said stored address defines a particular texel from which a particular piece of data, from said set of specific data, will be retrieved.

17. The system according to claim 16, further comprising means to retrieve said stored addresses from said selected texels in said second texture memory to said selected frame buffer pixels.

18. The system according to claim 12, further comprising thereafter means to store results of said performed set of SIMD instructions in same said selected frame buffer pixels.

19. The system according to claim 12, wherein software used to support the system is a graphics application programming interface.

20. The system according to claim 12, wherein said graphics application programming interface is OpenGL with a pixel texture extension.

21. A system for communicating between graphics memory storage elements, comprising:
(a) a texture memory for receiving a set of data into a set of texels wherein one or more of a plurality of channels have been dedicated for data storage;
(b) an address calculator for identify, for each texel in said set of texels, an address wherein said identified address can comprise one or more dimentions;
(c) a frame buffer for storing each said identified address, for each texel where specific data is stored, into a selected set of pixels wherein one or more of a plurality of channels have been dedicated for address storage; and
(d) a pixel-to-pixel communicator for using said stored addresses to retrieve said specific data into said selected set of pixels wherein one or more of a plurality of channels have been dedicated for data storage.

22. A system for communicating between graphics memory storage elements, comprising:
(a) a frame buffer for receiving a set of data into a set of pixels wherein one or more of a plurality of channels have been dedicated for data storage;
(b) an address calculator for identifying, for each pixel in said set of pixels, an address wherein said identified address can comprise one or more dimensions;
(c) a texture memory for storing each said identified address, for each pixel where specific data is stored, into a selected set of texels wherein one or more of a plurality of channels have been dedicated for data storage; and
(d) a pixel-to-pixel communicator for using said stored addresses to retrieve said specific data into said selected set of texels wherein one or more of a plurality of channels have been dedicated for address storage.

23. A system for executing single instruction, multiple data (SIMD) instructions using graphics technology, comprising:
(a) a texture memory for receiving a set of data into a set of texels wherein one or more of a plurality of channels have been dedicated for data storage;
(b) an address calculator for identifying, for each said texel in said set of texels, an address wherein said address may comprise one or more dimensions;
(c) a SIMD graphics API translator for receiving a set of SIMD instructions, for translating said set of SIMD instructions into a set of graphics API commands, for distinguishing a set of specific data, from said set of data, needed for said set of SIMD instructions, and for selecting frame buffer pixels to be used to support said set of SIMD instructions;
(d) a frame buffer for storing each said identified address, for each texel where specific data is stored, into a selected set of pixels wherein one or more of a plurality of channels have been dedicated for address storage;
(e) a pixel-to-pixel communicator for using said stored addresses to retrieve said specific data into said selected set of pixels wherein one or more of a plurality of channels have been dedicated for data storage; and
(f) a graphics accelerator for performing said set of SIMD instructions on said retrieved set of specific data in said selected frame buffer pixels.

* * * * *